United States Patent
Higashide et al.

(10) Patent No.: US 11,880,816 B2
(45) Date of Patent: *Jan. 23, 2024

(54) SETTLEMENT SYSTEM AND SETTLEMENT METHOD

(71) Applicant: NTT Communications Corporation, Tokyo (JP)

(72) Inventors: Haruhisa Higashide, Tokyo (JP); Yasuhide Katou, Tokyo (JP); Mitsuya Tomoda, Kashiwa (JP); Kentaro Numa, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,948

(22) Filed: Oct. 27, 2020

(65) Prior Publication Data

US 2021/0133716 A1    May 6, 2021

(30) Foreign Application Priority Data

Nov. 1, 2019  (JP) .................... 2019-200288

(51) Int. Cl.
*G06Q 20/20* (2012.01)
*G06Q 20/38* (2012.01)

(52) U.S. Cl.
CPC ......... *G06Q 20/201* (2013.01); *G06Q 20/204* (2013.01); *G06Q 20/209* (2013.01); *G06Q 20/381* (2013.01)

(58) Field of Classification Search
CPC .............................. G06Q 20/381; G06Q 20/20
See application file for complete search history.

(56) References Cited

U.S. PATENT DOCUMENTS

| 5,884,274 | A | 3/1999 | Walker et al. |
| 6,999,943 | B1 * | 2/2006 | Johnson ............... G06Q 40/025 |
| | | | 705/37 |

(Continued)

FOREIGN PATENT DOCUMENTS

| CN | 103875010 A | 6/2014 |
| CN | 107646123 A | 1/2018 |

(Continued)

OTHER PUBLICATIONS

Office Action dated Apr. 14, 2020 in Japanese Application No. 2019-200288 (w/English translation).

(Continued)

*Primary Examiner* — Florian M Zeender
*Assistant Examiner* — Vanessa Deligi
(74) *Attorney, Agent, or Firm* — Oblon, McClelland, Maier & Neustadt, L.L.P.

(57) ABSTRACT

According to one embodiment, a settlement system includes a server and a merchant device. The server includes a rate notification unit and a payment controller. The rate notification unit notifies the device of an exchange rate. The payment controller pays the amount to the device in a currency of a second country. The device includes a display controller and a sales notification unit. The display controller displays on a terminal of a user an amount of payment for purchase of an article in a currency of a first country. The sales notification unit reports to the server the sales information in the currency of the first country. Upon receipt of an image that contains an article, the display controller calculates the amount of payment for purchase of the article in the currency of the first country, and displays the calculated amount of payment on the image.

6 Claims, 5 Drawing Sheets

(56) References Cited

U.S. PATENT DOCUMENTS

| | | | |
|---|---|---|---|
| 7,337,142 B1* | 2/2008 | Holmes | G06Q 20/102 |
| | | | 705/40 |
| 7,747,475 B1* | 6/2010 | Bowman | G06Q 30/0601 |
| | | | 705/40 |
| 2004/0148255 A1 | 7/2004 | Beck et al. | |
| 2007/0038523 A1 | 2/2007 | Komem et al. | |
| 2011/0052083 A1* | 3/2011 | Rekimoto | H04N 1/00307 |
| | | | 382/218 |
| 2011/0112951 A1* | 5/2011 | Gould | G06Q 20/06 |
| | | | 705/37 |
| 2013/0044351 A1* | 2/2013 | Coulson | H04N 1/00188 |
| | | | 358/1.15 |
| 2013/0085927 A1 | 4/2013 | Scott | |
| 2014/0143073 A1 | 5/2014 | Doris-Down | |
| 2015/0073907 A1 | 3/2015 | Purves et al. | |
| 2015/0134318 A1* | 5/2015 | Cuthbert | G06F 40/47 |
| | | | 704/2 |
| 2016/0086179 A1* | 3/2016 | Barbier | G06Q 20/322 |
| | | | 705/44 |
| 2016/0140555 A1* | 5/2016 | Scipioni | G06Q 20/381 |
| | | | 705/43 |
| 2016/0267452 A1 | 9/2016 | Kim | |
| 2016/0328706 A1 | 11/2016 | Kennedy | |
| 2019/0066077 A1* | 2/2019 | Shimoirisa | G06Q 40/04 |
| 2019/0149725 A1* | 5/2019 | Adato | H04N 1/32144 |
| | | | 348/158 |
| 2019/0295064 A1* | 9/2019 | Malo | G06Q 20/201 |
| 2019/0303923 A1* | 10/2019 | Arora | G06Q 10/02 |

FOREIGN PATENT DOCUMENTS

| | | | | |
|---|---|---|---|---|
| CN | 102982441 B | | 7/2018 | |
| CN | 109427155 A | | 3/2019 | |
| EP | 3 457 368 A | | 3/2019 | |
| GB | 2560877 A | | 10/2018 | |
| GB | 2560877 A | * | 10/2018 | G06Q 20/381 |
| JP | 2000-509859 | | 8/2000 | |
| JP | 2002-298023 | | 10/2002 | |
| JP | 2006-513512 | | 4/2006 | |
| JP | 2006-318229 A | | 11/2006 | |
| JP | 2013-127811 | | 6/2013 | |
| JP | 103875010 A | | 6/2014 | |
| JP | 2014-215965 | | 11/2014 | |
| JP | 2015-038676 A | | 2/2015 | |
| JP | 2016-212797 | | 12/2016 | |
| JP | 107646123 A | | 1/2018 | |
| JP | 2018-515868 | | 6/2018 | |
| JP | 102982441 B | | 7/2018 | |
| JP | 2019-3634 | | 1/2019 | |
| JP | 109427155 A | | 3/2019 | |
| KR | 10-2009-0039894 A | | 4/2009 | |
| KR | 10-2010-0126065 A | | 12/2010 | |
| KR | 10-2016-0133704 A | | 11/2016 | |
| WO | WO 2012/054786 A1 | | 4/2012 | |

OTHER PUBLICATIONS

"From Ireland: an IT advanced country, Card Related Software—Latest Showcase," CardWave, vol. 16, No. 2, C.media Co., Ltd., Jan. 20, 2003, pp. 24-25.
International Search Report dated Jan. 26, 2021 in PCT/JP2020/040871 (with English translation of Category of Cited Documents), 9 pages.
Extended European Search Report dated Mar. 26, 2021 in European Patent Application No. 20203007.8, citing documents AA, AB, AO, and AP therein, 10 pages.
Office Action dated Jun. 1, 2021 in Chinese Application No. 202011895025 (w/computer-generated English translation).
Office Action dated Jun. 4, 2021 in Taiwanese Application No. 109137324 (w/computer-generated English translation).
Office Action dated Jun. 1, 2021 in Chinese Application No. 2020111895025 (w/computer-generated English translation).
Office Action dated Aug. 3, 2021 in Japanese Application No. 2020-103397 (w/computer-generated English translation).
Combined Chinese Office Action and Search Report dated Oct. 18, 2021 in Chinese Patent Application No. 202011189502.5 (with unedited computer generated Engiish translation), 28 pages.
Office Action dated May 20, 2021 in Singapore Application No. 10202010230Y.
Office Action dated Jan. 11, 2022 in European Application No. 20 203 007.8.
Office Action dated Dec. 17, 2021 in Taiwanese Application No. 109137324 (w/English translation).
Indian Office Action dated Dec. 6, 2021 in Indian Patent Application No. 202014046848, citing document AA therein, 7 pages.
Office Action dated Apr. 13, 2022 in Chinese Application No. 202011189502.5 (w/computer-generated English translation).
International Preliminary Report and Written Opinion dated May 12, 2022 in PCT/JP2020/040871 (submitting English translation only), 5 pages.
U.S. Office Action dated Aug. 19, 2022, in U.S. Appl. No. 17/739,367.
Extended European Search Report dated Jun. 29, 2022, in corresponding European Patent Application No. 22173361.1, 10 pages.
Office Action dated Jul. 13, 2022, in corresponding European Patent Application No. 20 203 007.8, 18 pages.
Chinese Office Action dated Dec. 16, 2022, issued in Chinese Patent Application No. 202210504544.6 (with English translation ).
Singapore Office Action dated May 23, 2023, issued in Singapore Patent Application No. 10202204626S.
Korean Office Action dated May 3, 2021 in Korean Application No. 10-2020-0142612 (with English translation), 13 pages.
European Office Action dated Nov. 10, 2023, issued in European Application No. 22 173 361.1.

* cited by examiner

| Purchaser name | Article name | Sales amount | Purchase time/date | Exchange rate at purchase |
|---|---|---|---|---|
| A | Candy A | $10 | 2019/9/20/13:10 | 107.54 |
| B | Juice B | $5 | 2019/9/21/14:25 | 107.66 |
| | | | | |

Merchant A

| Article name | Price |
|---|---|
| Bread A | ¥100 |
| Bread B | ¥300 |
| | |

SETTLEMENT SYSTEM AND SETTLEMENT METHOD

CROSS-REFERENCE TO RELATED APPLICATIONS

This application is based upon and claims the benefit of priority from prior Japanese Patent Application No. 2019-200288, filed Nov. 1, 2019, the entire contents of which are incorporated herein by reference.

FIELD

The present invention relates to a settlement system and a settlement method.

BACKGROUND

Conventionally, when purchasing merchandise abroad, a traveler looks at the price displayed in the local currency and pays for the merchandise. When the travel destination is Japan, for example, the traveler needs to look at the price displayed in Japanese yen to make payment. If the traveler uses his/her credit card to make payment, the amount of payment will be determined at a later date at an exchange rate at a time point determined by a credit card company.

CITATION LIST

Patent Literature

Patent Literature 1: Jpn. Pat. Appln. KOKAI Publication No. 2006-318229

SUMMARY

There has been a problem, however, in the above-described traditional method that the amount of payment in the home currency is difficult to ascertain. When the travel destination is Japan, for example, with the price displayed in Japanese yen, the traveler does not know the price in his/her home currency. If the traveler uses a credit card to make payment, the amount of payment will be fixed at a later date at an exchange rate at a time point determined by the credit card company, and therefore the traveler will not know the amount of payment at the time of making payment.

To solve the above issue and achieve a purpose of the embodiments, the settlement system according to the present embodiments comprises a server and a merchant device, wherein the server comprises: a rate notification unit configured to report, at a predetermined occasion, an exchange rate applicable for a predetermined period of time to the merchant device; and a payment controller configured to perform control to determine an amount of payment to be made to the merchant device, based on sales information reported by the merchant device and an exchange rate at a time of purchase, and pay the determined amount to the merchant device in a currency of a second country, which is a home currency for the merchant device, the merchant device comprises a display controller configured to perform control, based on the exchange rate reported by the server, to display on a terminal of a user an amount of payment for purchase of an article in a currency of a first country designated by the user; and a sales notification unit configured to, if the user purchases the article, report to the server the sales information in the currency of the first country calculated based on the exchange rate reported by the server.

Furthermore, the settlement method of the present embodiments is implemented by a settlement system comprising a server and a merchant device, and the method comprises reporting, by the server, an exchange rate to the merchant device at a predetermined occasion; controlling, by the merchant device, to display on a terminal of a user an amount of payment for purchase of an article in a currency of a first country designated by the user, based on the exchange rate reported by the server; notifying, by the merchant device, if the user purchases the article, the server of sales information in a currency of a first country that is calculated based on the exchange rate reported by the server; and controlling, by the server, to determine an amount of payment to the merchant device based on the sales information reported by the merchant device and the exchange rate at a time of purchase, and to pay the determined amount to the merchant device in a currency of a second country, which is a home currency for the merchant device.

The present embodiments produce an effect of allowing a user to purchase merchandise in his/her home currency while checking the price in the home currency.

DETAILED DESCRIPTION

Embodiments of a settlement system and a settlement method according to the present invention will be described in detail below with reference to the drawings. The settlement system and settlement method according to the present invention, however, should not be limited by these embodiments.

First Embodiment

In the following description, the outline of a settlement system 100 according to the first embodiment, the configuration of a server 10, and the configuration of a merchant device 20 will be described in order, and finally the effects of the first embodiment will be discussed. In the following description of the embodiment, a credit card is used for the purchase of merchandise. The purchase is not limited thereto, however, and merchandise may be purchased using a debit card or a QR code (trademark).

[Configuration of Settlement System]

Figure 1:
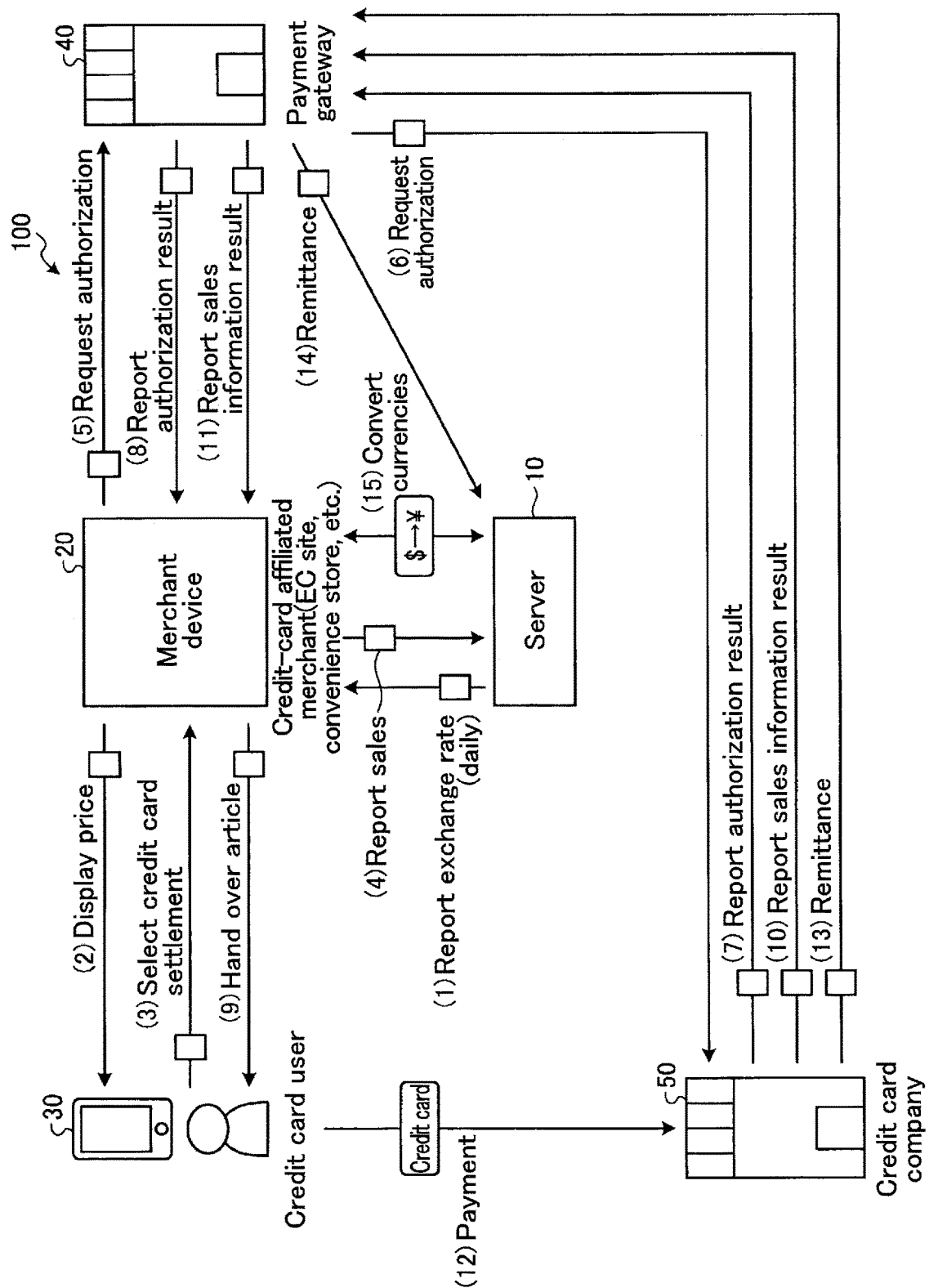
FIG. 1 is a diagram showing the outline of a settlement system according to the first embodiment.

FIG. 1 is a diagram showing the outline of a settlement system according to the first embodiment. The settlement system 100 according to the first embodiment includes a server 10, a merchant device 20, a terminal 30, a payment gateway 40, and a credit card company 50. The configuration of FIG. 1 is presented merely as an example, and therefore the detailed configuration and the number of devices are not limited thereto.

The settlement system 100 offers services with which, when charging a purchase to a credit card at a merchant overseas, the user can check the amount of payment in his/her home currency and make the purchase in the home currency based on the presently fixed exchange rate.

In the following description with reference to FIG. 1, a situation of an American credit card user traveling to Japan will be discussed. In this example, the home country of the user is the United States, and therefore the United States is denoted as the first country and Japan is denoted as the second country.

The server 10 of the settlement system 100 reports the exchange rate good for a certain period of time to devices in the credit-card affiliated merchants, at certain occasions. The server 10 may report the exchange rate of the day daily. The server 10 may determine in any manner the exchange rate to be reported.

The server 10 performs control to determine the amount of payment to the merchant device 20 based on the sales information reported by the merchant device 20 and the exchange rate of the purchase time and pay the determined amount to the merchant device 20 in the currency of the second country, which is the home currency for the merchant device 20. For instance, the server 10 receives the user's payment from the payment gateway 40 in dollars (US dollars), converts the currency from US dollars to Japanese yen, and pays to a Japanese merchant device 20 in Japanese yen.

The merchant device 20 is an information processor that realizes settlement for credit-card affiliated merchants at which settlements can be made on credit cards, and the merchant device 20 may be realized by a server or a cloud system. Based on the exchange rate reported by the server 10, the merchant device 20 performs control in a manner such that the amount of payment for the purchased merchandise is displayed on the terminal 30 in the currency of the first country designated by the user. For instance, the merchant device 20 calculates the amount of payment in dollars from the price in Japanese yen of an item that the credit card user wishes to purchase and the exchange rate, and displays the calculated amount of payment in dollars on the terminal 30 of the credit card user.

Furthermore, if the credit card user purchases merchandise on a credit card, the merchant device 20 notifies the server 10 of the sales information in the currency of the first country, calculated based on the exchange rate reported by the server 10. The credit-card affiliated merchants are not limited to convenience stores and other bricks-and-mortar shops, but may be electronic commerce (EC) sites that conduct sales operations on websites.

The terminal 30 is a smart device such as a smartphone or a tablet, which is a mobile terminal apparatus capable of communicating with a server through a wireless communication network. The terminal 30 may be an information processing apparatus such as a desktop personal computer (PC) or notebook PC. The terminal 30 has a function of specifying the current location through the use of a positioning system such as a global positioning system (GPS) and outputting the location information indicating the specified location.

The payment gateway 40 includes an information processor or the like configured to offer services of overall credit card settlement transactions including data processing and transaction processing, to merchants in the non-face-to-face market of credit card shopping. The payment gateway 40 may be implemented by a server or a cloud system. The credit card company 50 includes an information processor or the like configured to perform a credit card settlement, which is a deferred payment for the purchase of merchandise. This information processor may be implemented by a server or a cloud system.

With the settlement system 100, an amount of payment can be displayed on the terminal 30 when the credit card user purchases merchandise in a foreign travel destination country. In addition, the amount of settlement can be fixed to the price in the home currency displayed at the time of purchase. Furthermore, with the settlement system 100, the credit card payment flow remains unchanged for the credit card user from the conventional flow. Purchases in a foreign country therefore can be made in the same manner as purchases in the home country with the credit card.

Here, using the example of FIG. 1, a processing flow up to the completion of the payment for purchased merchandise will be explained in a situation of a credit card user selecting a credit card settlement for the merchandise purchased at a merchant. As shown in FIG. 1, the server 10 reports the exchange rate of the day daily to the merchant device 20 of the credit-card affiliated merchant (see (1) in FIG. 1). Upon receipt of an exchange rate from the server 10, the merchant device 20 stores this exchange rate.

Furthermore, upon receipt of a request to display the price from the terminal 30, the merchant device 20 performs control in a manner such that the price of the merchandise (amount of payment) will be displayed on the terminal 30 in the currency (e.g. US dollars) designated by the user based on the exchange rate reported by the server 10 (see (2) in FIG. 1).

For instance, upon receipt of an image of an article that the user wishes to purchase from the terminal 30, the merchant device 20 performs control in such a manner as to identify the price of the article contained in this image, calculate the amount of payment in the currency designated by the user from the price of the article and the exchange rate, and display on the terminal 30 the amount of payment for the article in the currency designated by the user (e.g., in US dollars).

Figure 2:
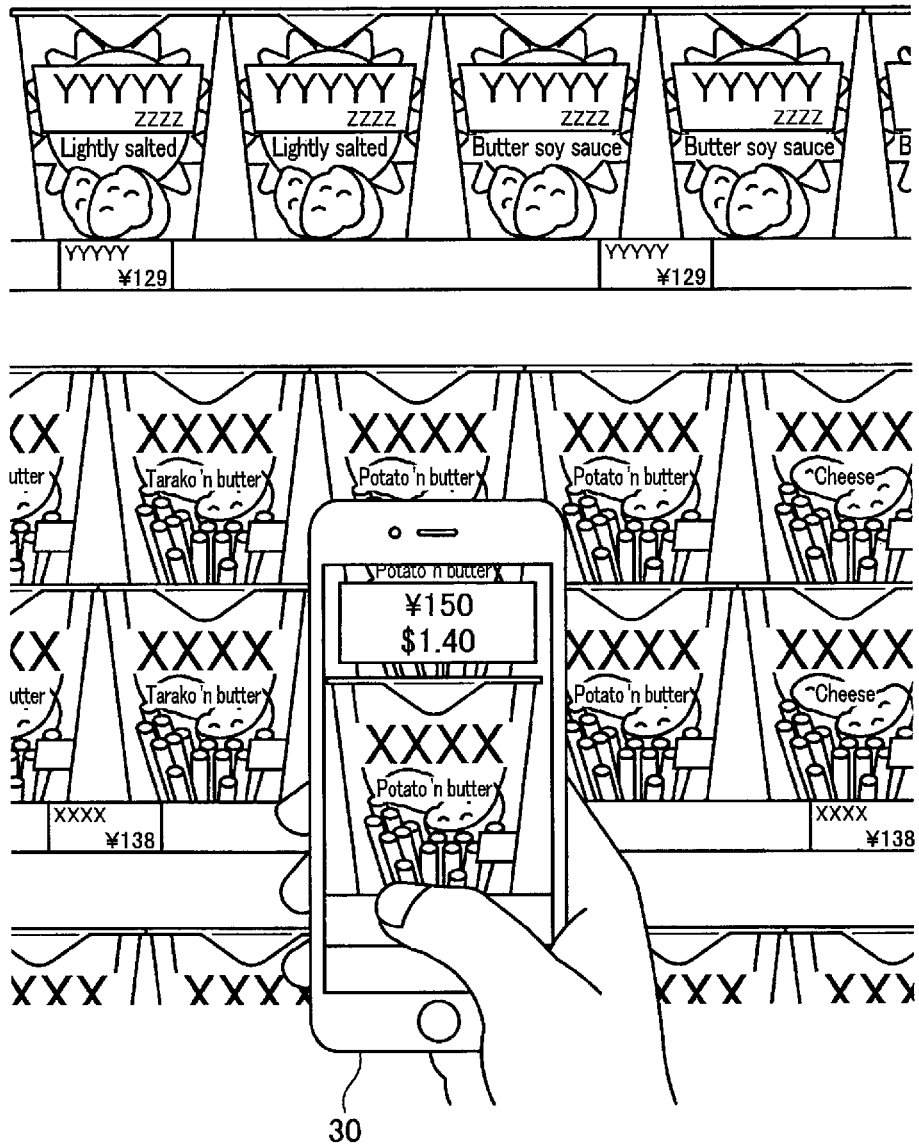
FIG. 2 is a diagram showing an example of a price displayed in the home currency on a terminal.

FIG. 2 is a diagram showing an example of a price displayed in the home currency on a terminal. In the example of FIG. 2, the terminal 30 takes with a camera an image of articles laid out at a merchant shop such as a convenience store, and sends the image to the merchant device 20. The merchant device 20 displays prices in both Japanese yen and US dollars on the image of the article on the terminal 30. The displayed prices are the amount of actual payment that the credit card user is going to make, including fees for the credit card transaction, and therefore may differ from the prices displayed at the merchant. Moreover, the fees may vary among the merchants.

If the credit card user selects a settlement for the purchased merchandise on a credit card in the home currency (US dollars) of the credit card user (see (3) in FIG. 1), the merchant device 20 notifies the server 10 of the sales information regarding the purchase of the merchandise in the home currency (US dollars) (see (4) in FIG. 1). The merchant device 20 further requests authorization from the payment gateway 40 for the credit card settlement (see (5) in FIG. 1).

The payment gateway 40 notifies the credit card company 50 of this authorization request (see (6) in FIG. 1). Thereafter, the credit card company 50 notifies the payment gateway 40 of the authorization result (see (7) in FIG. 1). The payment gateway 40 notifies the merchant device 20 of this authorization result (see (8) in FIG. 1). If the authorization result raises no problems, the credit-card affiliated merchant hands over the article to the credit card user (see (9) in FIG. 1).

The credit card company 50 notifies the payment gateway 40 of the result of the sales information relating to the credit card settlement (see (10) in FIG. 1). The payment gateway 40 notifies the merchant device 20 of the result of the sales information (see (11) in FIG. 1).

Thereafter, the credit card user makes a payment to the credit card company in the home currency (US dollars) of the credit card user in the same manner as in the conventional system (see (12) in FIG. 1). The credit card company 50 remits the amount in US dollars to the payment gateway 40 (see (13) in FIG. 1). Then, the payment gateway 40 remits the amount in US dollars to the server 10 (see (14) in FIG. 1). The processing in (3) to (13) of FIG. 1 is the same as that of the conventional credit card settlement.

When the server 10 confirms the receipt of the amount in US dollars, the currency is converted (see (15) in FIG. 1) so that the amount in Japanese yen can be remitted to the credit-card affiliated merchant. Here, fees for currency conversion may be imposed. In the case of the credit card user wishing to return the purchased article, the merchant device 20 returns the amount at the same exchange rate as the rate at the time of purchasing.

As mentioned above, the processing in (3) to (13) of FIG. 1 is the same as when the credit card user makes a payment to the credit card company 50 on a credit card in the home country. That is, the processing flow for the credit card user and the credit card company 50 is the same when a purchase is made on a credit card in the settlement system 100 according to the present embodiment and when a purchase is made in the home country as usual.

The settlement system 100 offers services with which, when charging merchandise to a credit card at a merchant in a foreign country, the user can ascertain the amount of payment in his/her home currency at the time of making payment. In addition, with the settlement system 100, the amount of settlement can be fixed to the amount at the time of purchasing. Thus, the credit card user can safely make purchases without being concerned about a risk of exchange rate fluctuations.

[Configuration of Server]

Figures 3, 4:
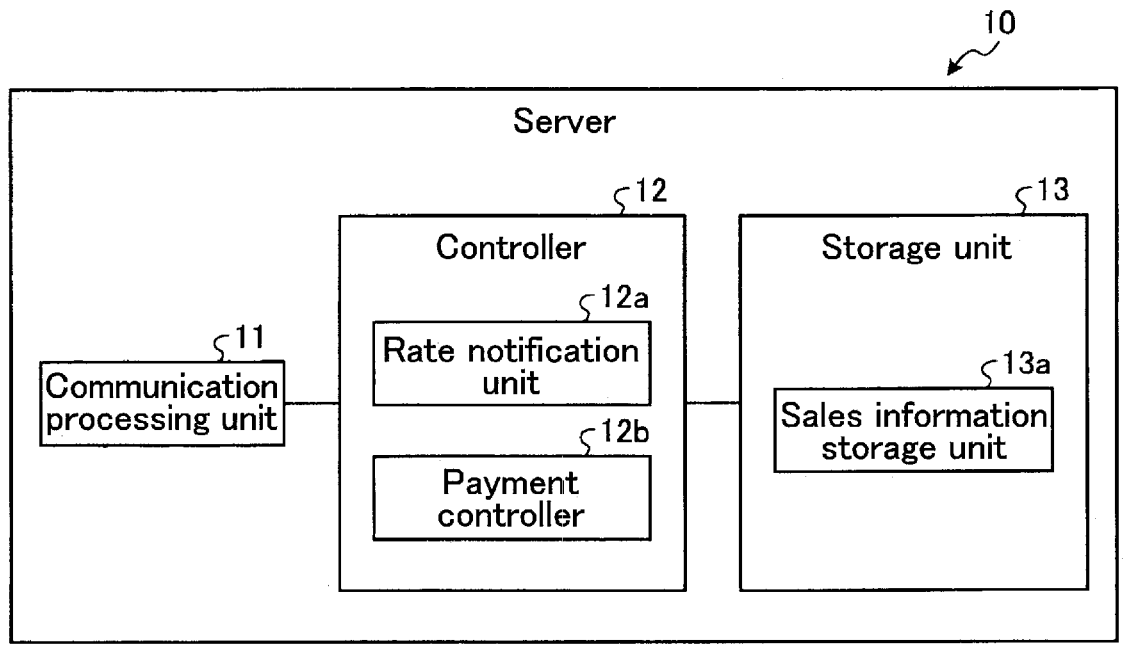
FIG. 3 is a block diagram showing an exemplary configuration of the server according to the first embodiment.
FIG. 4 is a diagram showing exemplary data stored in a sales information storage unit.

Next, the configuration of the server 10 will be described with reference to FIG. 3. FIG. 3 is a block diagram showing an exemplary configuration of the server according to the first embodiment. As illustrated in FIG. 3, the server 10 includes a communication processing unit 11, a controller 12, and a storage unit 13. The processing of the components of the server 10 will be described below. The functions of the server 10 may be divided and assigned to multiple apparatuses.

The communication processing unit 11 controls communications relating to various types of information. The communication processing unit 11 may control the communications between the merchant device 20 of the credit-card affiliated merchant and the payment gateway 40.

The storage unit 13 stores data and programs necessary for various processing performed by the controller 12. In particular, the storage unit 13 includes a sales information storage unit 13a, as a component relevant to the present embodiment. The storage unit 13 may be a semiconductor memory element such as a random access memory (RAM) and a flash memory, or a storage device such as a hard disk and an optical disk.

The sales information storage unit 13a stores information relating to the sales of the credit-card affiliated merchant. As shown in FIG. 4, for example, the sales information storage unit 13a stores, as information relating to sales when a credit card settlement is selected, the "purchaser name" indicating the name of the purchaser who has purchased an article, "article name" indicting the name of the article purchased, the "sales amount" effected by the purchase of the article, a "purchase time/date" indicating the time and date of the purchase, and an "exchange rate at purchase" indicating the exchange rate applicable at the time of the purchase, in association with each other. In the example of FIG. 4, the sales information storage unit 13a stores the rate of yen to US dollars as an exchange rate at the time of purchase.

The controller 12 includes an internal memory for storing required data and programs defining various processing procedures, thereby implementing various processing. In particular, the controller 12 includes a rate notification unit 12a and a payment controller 12b as components closely related to the present embodiment. Here, the controller 12 is an electronic circuit such as a central processing unit (CPU) and a micro processing unit (MPU), or an integrated circuit such as an application specific integrated circuit (ASIC) and a field programmable gate array (FPGA).

The rate notification unit 12a reports exchange rates to the merchant device 20 of the credit card affiliated merchant at a predetermined occasion. The rate notification unit 12a may report, for example, the exchange rate of the day daily to the merchant device 20. Alternatively, the rate notification unit 12a may report the exchange rate applicable to individual credit card users for a certain period of time, to the merchant device 20. For instance, the rate notification unit 12a may report, as an exchange rate applicable a credit card user who is traveling abroad for a certain period of time, a fixed exchange rate applicable during his/her traveling period to the merchant device 20.

The payment controller 12b performs control to determine the amount of payment to the merchant device 20 based on the sales information reported by the merchant device 20 and the exchange rate of the purchase time and pay the determined amount to the merchant device 20 in the currency of the second country, which is the home currency for the merchant device 20.

If the credit card user makes a payment to the credit card company 50 in the currency of the first country, and the amount in the first currency is remitted from the credit card company 50 to the payment gateway 40, the payment controller 12b reads the sales information stored in the sales information storage unit 13a, calculates the amount of payment in the second currency from the sales amount in the read-out sales information and the exchange rate at the time of the credit card user purchasing the article, and pays to the merchant device 20 the remaining amount in the currency of the second country after subtracting a predetermined fee from the amount of payment.

[Configuration of Merchant Device]

Figures 5, 6:
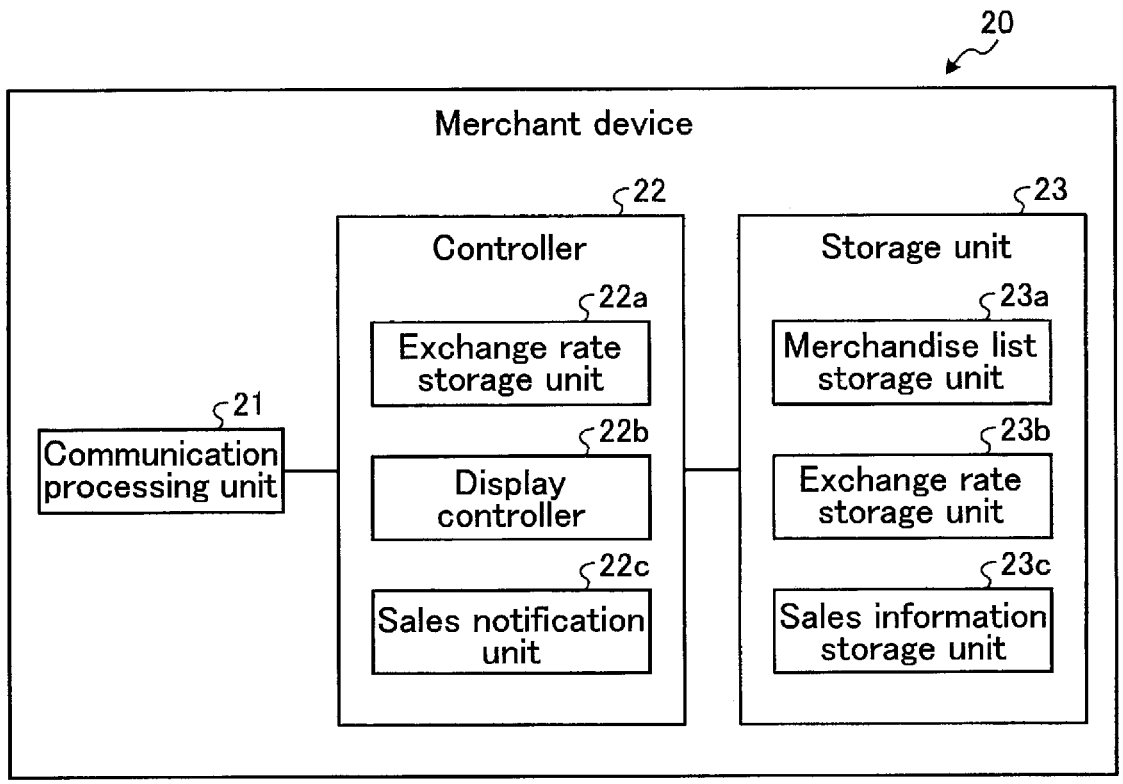
FIG. 5 is a block diagram showing an exemplary configuration of a merchant device according to the first embodiment.
FIG. 6 is a diagram showing exemplary data stored in a merchandise list information storage unit.

Next, by referring to FIG. 5, the configuration of the merchant device 20 will be described. FIG. 5 is a block diagram showing an exemplary configuration of a merchant device according to the first embodiment. The merchant device 20 includes a communication processing unit 21, a controller 22, and a storage unit 23, as illustrated in FIG. 5. The processing of the components of the merchant device 20 will be described below. The functions of the merchant device 20 may be divided and assigned to multiple apparatuses.

The communication processing unit 21 controls communications relating to various types of information. The communication processing unit 21 may control the communications between the server 10 and the terminal 30.

The storage unit 23 stores data and programs necessary for various types of processing performed by the controller 22. In particular, the storage unit 23 includes a merchandise list storage unit 23a, an exchange rate storage unit 23b, and a sales information storage unit 23c as components closely related to the present embodiment. The storage unit 23 may be a semiconductor memory element such as a RAM and a flash memory, or a storage device such as a hard disk and an optical disk.

The merchandise list storage unit 23a stores a list of merchandise articles available in the credit-card affiliated merchant. As shown in FIG. 6, the merchandise list storage unit 23a may store, for each credit-card affiliated merchant, the articles for sale in association with the "article names" indicating the names of the articles and "article prices" indicating the retail prices of the articles.

The exchange rate storage unit 23b stores the exchange rate information reported by the server 10. If the server 10 reports the exchange rate daily, the exchange rate storage unit 23b stores the date and the exchange rate in association with each other. If the applied exchange rates differ from user to user of the credit card, the exchange rate storage unit 23b stores the credit card users and exchange rates in association with each other.

The sales information storage unit 23c stores information relating to the sales of the credit-card affiliated merchant. For instance, the sales information storage unit 23c stores, as information relating to sales when a credit card settlement is selected, the "purchaser name", "article name", "sales amount", "purchase time/date", and "exchange rate at purchase" in the same manner as in the aforementioned FIG. 4.

The controller 22 includes an internal memory for storing required data and programs defining various processing procedures, thereby implementing various types of processing. In particular, the controller 22 includes an exchange rate storage unit 22a, a display controller 22b, and a sales notification unit 22c as components closely related to the present embodiments. Here, the controller 22 is an electronic circuit such as a central processing unit (CPU) and a micro processing unit (MPU), or an integrated circuit such as an application specific integrated circuit (ASIC) and a field programmable gate array (FPGA).

Upon receipt of an exchange rate from the server 10, the exchange rate storage unit 22a stores the received exchange rate in the exchange rate storage unit 23b. For instance, the exchange rate storage unit 22a receives the exchange rate daily from the server 10, and stores the date and the exchange rate in association with each other in the exchange rate storage unit 23b.

Based on the exchange rate reported by the server 10, the display controller 22b performs control in a manner such that the amount of payment for the purchased article is displayed on the terminal 30 of the user in the currency of the first country designated by the user. For instance, upon receipt of an image of an article that the user wishes to purchase from the terminal 30, the display controller 22b performs control in such a manner as to identify the price of the article contained in this image, calculate the amount of payment in the currency designated by the user from the price of the article and the exchange rate, and display the amount of payment in the currency designated by the user on the image. Here, the display controller 22b calculates the amount of payment by adding on the fees for the server 10 and fees that vary in accordance with the credit card companies and merchants to display the amount. The amount of payment displayed by the display controller 22b is the exact amount that the user will actually pay.

Furthermore, if the user meets certain conditions, the display controller 22b may offer a preferential exchange rate to the user so that the amount of payment can be discounted. For instance, if the user has an electronic coupon issued by the merchant, the display controller 22b may change the exchange rate in accordance with the description of the coupon and calculate a discounted amount of payment.

Moreover, the display controller 22b may offer a discount on the amount of payment in accordance with the user's purchase history. In particular, the display controller 22b may refer to the sales information storage unit 23c and, if the purchase history includes a purchase of a specific high-value article or a purchase of a predetermined amount or more, offer a discount and calculate the amount of payment for the purchase made during a predetermined period of time.

Furthermore, the display controller 22b may offer a discount on the amount of payment based on a status of membership that varies in accordance with the number of times of use, the total purchase amount, and the like. The status of membership may be raised in stages, for example, when the number of times of use of the payment system 100 exceeds a predetermined threshold value or when the total purchase amount exceeds a predetermined amount. The display controller 22b may calculate a discounted amount of payment by changing the exchange rate in accordance with the status of membership.

The display controller 22b may further offer a discount on the amount of payment in accordance with an alliance stamp rally. A stamp rally may be held commonly among multiple merchants. The display controller 22b may change the exchange rate in accordance with the stamps collected at the stamp rally and calculate a discounted amount of payment.

More specifically, upon receipt of an image of an article the user wishes to purchase from the terminal 30, the display controller 22b analyzes the image to identify the name of the article contained in the image. The display controller 22b may be the one that performs the processing of the image analysis, or may request an external device to perform the processing. The display controller 22b identifies the price of the article corresponding to the article name from the merchandise list storage unit 23a. Thereafter, the display controller 22b performs control to read an applicable one of the exchange rates, calculate the amount of payment in the currency of the first country from the price of the article, the exchange rate, and the fees, and display the calculated amount of payment on the image.

The display controller 22b may perform control to acquire positional information from the terminal 30, identify from this positional information the merchant at which the terminal 30 is located, calculate the amount of payment in the currency of the first country for the purchase of the article in accordance with the price of the article and fees of the identified merchant, and display the calculated amount of payment on the terminal 30.

The display controller 22b may acquire positional information from the terminal 30, identify the merchant at which the terminal 30 is located based on the positional information, read the merchandise list corresponding to the identified merchant from the merchandise list storage unit 23a, and identify the price of the article corresponding to the article name from the merchandise list of the identified merchant. The display controller 22b also identifies the fees of the identified merchant if the fees vary depending on the merchants. Thereafter, the display controller 22*b* performs control to read the applicable one of the exchange rates, calculate the amount of payment in the currency of the first country from the price of the article, the exchange rate, and the fees, and display the calculated amount of payment on the image of the article.

If the credit card user purchases the article on a credit card, the sales notification unit 22*c* notifies the server 10 of the sales information in the currency of the first country that has been calculated based on the exchange rate reported by the server 10. If the user, who is a foreign traveler, selects a credit card settlement in the home currency, the sales notification unit 22*c* stores in the sales information storage unit 23*c* the sales information in the currency of the first country that has been calculated based on the exchange rate reported by the server 10, and notifies the server 10 of the sales information.

Effects of First Embodiment

The server 10 of the settlement system 100 according to the first embodiment reports an exchange rate to a merchant device 20 in the credit-card affiliated merchant at certain occasions. The merchant device 20 performs control in a manner such that, based on the exchange rate reported by the server 10, the amount of payment for the purchase of an article will be displayed on the terminal 30 in the currency of the first country designated by the user. Furthermore, if the user purchases the article on a credit card, the merchant device 20 notifies the server 10 of the sales information in the currency of the first country that has been calculated based on the exchange rate reported by the server 10. The server 10 determines the amount of payment to the merchant device 20 based on the sales information reported by the merchant device 20 and the exchange rate at the time of the purchase, and pays the determined amount to the merchant device 20 in the currency of the second country, which is the home currency for the merchant device 20. According to the present embodiments, the user can purchase an article in his/her home currency while checking the price in the home currency.

Furthermore, upon receipt of an image of an article that the user wishes to purchase from the terminal 30, the merchant device 20 identifies the price of the article contained in the image, calculates the amount of payment for the purchase of the article in the currency of the first country from the price of the article and the exchange rate, and displays the calculated amount of payment on the image of the article. Thus, when the user starts up a predetermined application on the terminal 30 and takes with the camera of the terminal 30 an image of an article that the user wishes to purchase, the amount of payment in the home currency is displayed on the terminal 30. Thus, the user can easily check the price in the home currency.

The server 10 reports the exchange rate applicable to individual users for a predetermined period of time to the merchant device 20. In this manner, the settlement system 100 can fix the exchange rate applicable for a predetermined period of time, for example, to a credit card user who travels abroad for this period so that the exchange rate can be fixed for a specific credit card user during the traveling period.

Furthermore, the merchant device 20 performs control to acquire positional information from the terminal 30, identify from this positional information the merchant at which the terminal 30 is located, calculate the amount of payment in the currency of the first country for the purchase of the article in accordance with the price of the article and fees of the identified merchant, and display the calculated amount of payment on the image. Thus, in the settlement system 100, even when the price of an article and fees differ from merchant to retailer, the price at a targeted merchant can be displayed in the user's home currency on the terminal 30.

(System Configuration)

The components of each apparatus illustrated in the drawings are only to represent conceptual functions, and may not be always physically configured as illustrated in the drawings. That is, specific forms of the distribution and integration of the apparatuses are not limited to those illustrated in the drawings. All or part of the apparatuses may be configured to be functionally or physically distributed or integrated in units as desired in accordance with various loads, usage conditions, and the like. Furthermore, all or part of the processing functions performed in the apparatuses may be realized by the CPU and a program analyzed and implemented by the CPU, or may be realized as hardware by wired logic.

Among the processes described in the present embodiment, all or part of the processes described as being automatically performed may be manually performed, or all or part of the processes described as being manually performed may be automatically performed with a commonly known method. In addition, the processing procedures, the control procedures, the specific names, and the information including various types of data and various parameters shown in the specification and the drawings can be freely changed, unless otherwise specified.

(Programs)

It is also possible to create a program by describing the processing executed by the apparatuses in the above embodiment in a computer-executable language. For example, a program may be created by describing the processing executed by the server 10 according to the embodiment in a computer-executable language. If this is the case, the same effects as those of the above-described embodiment can be achieved by the computer executing the program. Such a program may be stored in a computer-readable storage medium so that the same processing as that of the above-described embodiment can be realized by a computer reading and executing the program stored in the storage medium.

Figure 7:
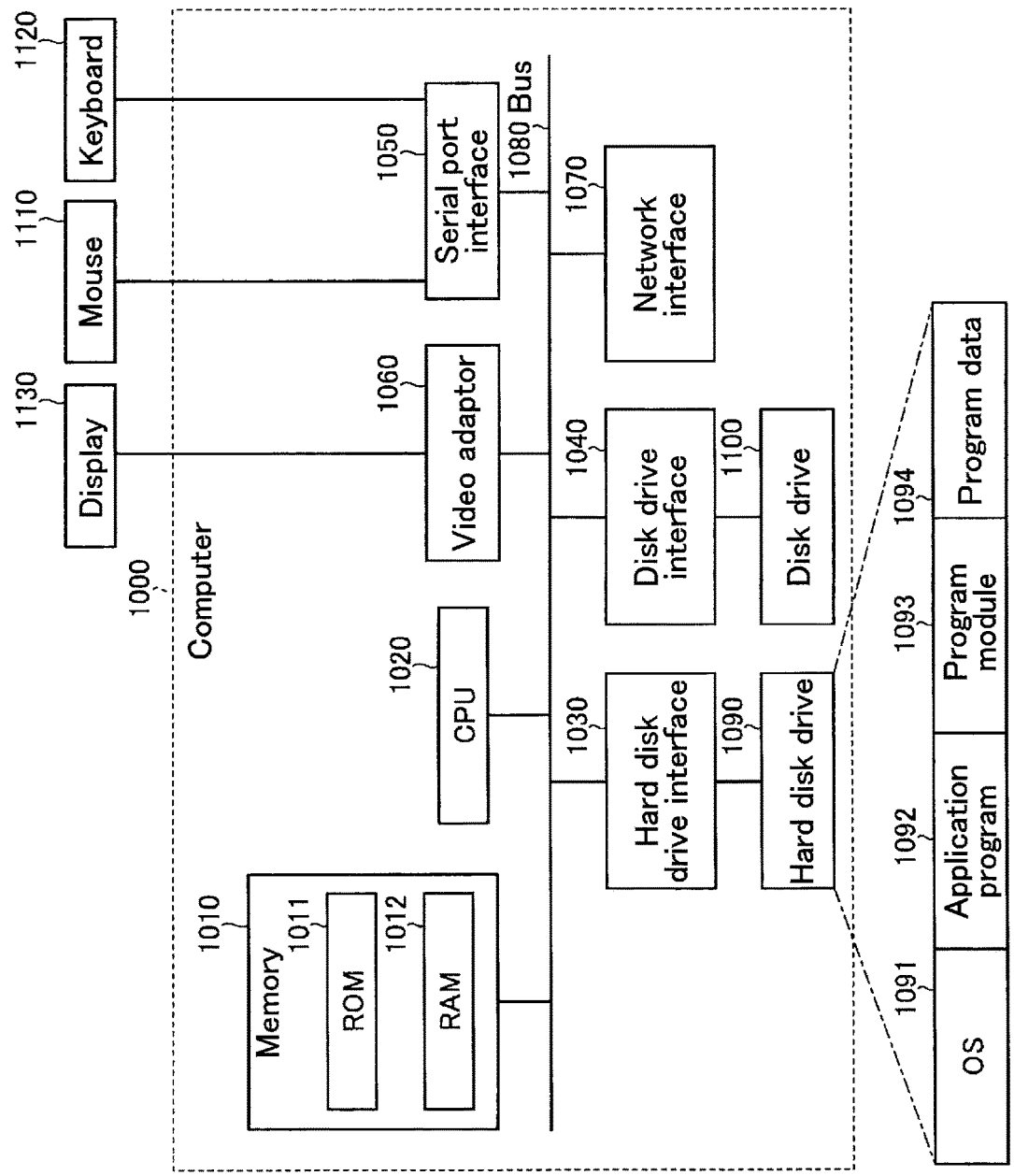
FIG. 7 is a diagram showing a computer configured to implement programs.

FIG. 7 is a diagram showing a computer configured to implement programs. As illustrated in FIG. 7, the computer 1000 may include a memory 1010, a CPU 1020, a hard disk drive interface 1030, a disk drive interface 1040, a serial port interface 1050, a video adaptor 1060, and a network interface 1070. These components are coupled to one another by way of a bus 1080.

As illustrated in FIG. 7, the memory 1010 includes a read only memory (ROM) 1011 and a RAM 1012. The ROM 1011 stores a boot program such as the basic input output system (BIOS). The hard disk drive interface 1030 is coupled to a hard disk drive 1090 as illustrated in FIG. 7. The disk drive interface 1040 is coupled to the disk drive 1100, as illustrated in FIG. 7. For instance, a removable storage medium such as a magnetic disk or an optical disk is inserted into the disk drive 1100. The serial port interface 1050 may be coupled to a mouse 1110 and a keyboard 1120, as illustrated in FIG. 7. The video adaptor 1060 may be coupled to a display 1130, as illustrated in FIG. 7.

Here, the hard disk drive 1090 may store an OS 1091, an application program 1092, a program module 1093, and program data 1094, as illustrated in FIG. 7. That is, the above program may be stored in the hard disk drive 1090 as a program module in which instructions to be executed by the computer 1000 are described.

The various data described in the above embodiment may be stored as program data in the memory 1010 or the hard disk drive 1090. Then, the CPU 1020 reads the program module 1093 and the program data 1094 stored in the memory 1010 and the hard disk drive 1090, as necessary, onto the RAM 1012, and thereby executes various processing procedures.

The program module 1093 and the program data 1094 relating to the program are not limited to those stored in the hard disk drive 1090, and may be stored in a removable storage medium and read out by the CPU 1020 by way of a disk drive or the like. Alternatively, the program module 1093 and the program data 1094 relating to the program may be stored in a different computer connected via a network (e.g., Local Area Network (LAN) and Wide Area Network (WAN)) and read out by the CPU 1020 by way of the network interface 1070.

The above embodiment and its modifications are included in the technique disclosed in the present application, and also included in the scope of the invention described in the claims and its equivalent scope.

REFERENCE SIGNS LIST

10 Server
11, 21 Communication processing unit
12, 22 Controller
12*a* Rate notification unit
12*b* Payment controller
13, 23 Storage unit
13*a* Sales information storage unit
20 Merchant device
22*a* Exchange rate storage unit
22*b* Display controller
22*c* Sales notification unit
23*a* Merchandise list storage unit
23*b* Exchange rate storage unit
23*c* Sales information storage unit
30 Terminal
40 Payment gateway
50 Credit card company
100 Settlement system

The invention claimed is:

1. A settlement system comprising
a server;
a mobile terminal apparatus of a user; and
a merchant device, wherein
the server comprises:
  a memory configured to store a first exchange rate applicable to the user for a predetermined period of time, sales information reported by the merchant device, and a second exchange rate applicable for a time except for the predetermined period of time, wherein the first exchange rate and the second exchange rate are associated with a user; and
  processing circuitry configured to:
    report, at a predetermined occasion, one of the first exchange rate and the second exchange rate to the merchant device based on whether or not the predetermined occasion is included in the predetermined period of time, and
    perform control to
      determine an amount of payment to be made to the merchant device, based on the sales information reported by the merchant device and the one of the first exchange rate and the second exchange rate,
      pay the determined amount to the merchant device in a currency of a second country, the currency of the second country being a home currency for the merchant device, and
      fix an amount of settlement for the user to a price in a currency of a first country, the price being displayed on a mobile terminal apparatus of the user at a time of purchase, the currency of the first country being designated by the user, the mobile terminal apparatus communicating with the server and the merchant device, the mobile terminal apparatus being owned by the user,
the merchant device comprises:
  a memory configured to store the one of the first exchange rate and the second exchange rate reported by the server; and
  processing circuitry configured to:
    perform control to cause the mobile terminal apparatus of the user to display an article that the user wishes to purchase, and to cause the mobile terminal apparatus of the user to display, based on an exchange rate selected from the first exchange rate and the second exchange rate according to whether the time of purchase is included in the predetermined period of time, an amount of payment for purchase of the article in the currency of the first country designated by the user, wherein the article that the user wishes to purchase, the amount of payment for purchase of the article in the currency of the first country being-are contained in an image, the article is sold in a merchant shop, and the merchant device is set in the merchant shop, and
    if the user purchases the article, notify the server of the sales information in the currency of the first country, the sales information being calculated by the merchant based on the selected exchange rate,
the mobile terminal apparatus comprises:
  capture the image containing the article to be purchased in the second country,
  transmit the image to the merchant device, and
the merchant device performs control to
  identify, upon receipt of the image that contains the article that the user wishes to purchase from the-mobile terminal apparatus, a price in the currency of the second country of the article, and
  calculate the amount of payment for purchase of the article in the currency of the first country based on the price in the currency of the second country of the article and the selected exchange rate.

2. The settlement system according to claim 1, wherein the server reports to the merchant device the first exchange rate applicable to the user for the predetermined period of time,
the processing circuitry is further configured to
  change the first exchange rate if the user who owns the mobile terminal apparatus meets a condition, and
  calculate a discounted amount of payment for purchase of the article.

3. The settlement system according to claim 1, wherein the mobile terminal apparatus displays the article, the amount of payment for purchase of the article in the currency of the first country, and the amount of payment for purchase of the article in the currency of the second country, and the merchant device further performs control to acquire positional information from the mobile terminal apparatus, identify the merchant shop at which the mobile terminal apparatus is located based on the positional information, calculate the amount of payment for purchase of the article in the currency of the first country from the price in the currency of the second country of the article and fees corresponding to the identified merchant, and display the calculated amount of payment on the image, the predetermined period is determined by a period of time for which the user stays in a second country, and the sales information is reported by the merchant device.

4. A settlement method implemented by a settlement system comprising a server, a mobile terminal apparatus of a user, and a merchant device, the method comprising:

at the server:
storing, at a memory, a first exchange rate applicable to the user for a predetermined period of time, sales information reported by the merchant device, and a second exchange rate applicable for a time except for the predetermined period of time, wherein the first exchange rate and the second exchange rate are associated with a user;

reporting, at a predetermined occasion, one of the first exchange rate and the second exchange rate to the merchant device based on whether or not the predetermined occasion is included in the predetermined period of time, and performing control to
determine an amount of payment to be made to the merchant device, based on the sales information reported by the merchant device and the one of the first exchange rate and the second exchange rate,
pay the determined amount to the merchant device in a currency of a second country, the currency of the second country being a home currency for the merchant device, and
fix an amount of settlement for the user to a price in a currency of a first country, the price being displayed on a mobile terminal apparatus of the user at a time of purchase, the currency of the first country being designated by the user, the mobile terminal apparatus communicating with the server and the merchant device, the mobile terminal apparatus being owned by the user, at the merchant device:
storing, at a memory, the one of the first exchange rate and the second exchange rate reported by the server; and
performing control to cause the mobile terminal apparatus of the user to display an article that the user wishes to purchase, and to cause the mobile terminal apparatus of the user to display, based on an exchange rate selected from the first exchange rate and the second exchange rate according to whether the time of purchase is included in the predetermined period of time, an amount of payment for purchase of the article in the currency of the first country designated by the user, wherein the article that the user wishes to purchase, the amount of payment for purchase of the article in the currency of the first country are contained in an image, the article is sold in a merchant shop, and the merchant device is set in the merchant shop, and if the user purchases the article, notifying the server of the sales information in the currency of the first country, the sales information being calculated by the merchant based on the selected exchange rate, at the mobile terminal apparatus:
capturing the image containing the article to be purchased in the second country,
transmitting the image to the merchant device, and the merchant device performs control to
identify, upon receipt of the image that contains the article that the user wishes to purchase from the mobile terminal apparatus, a price in the currency of the second country of the article, and
calculate the amount of payment for purchase of the article in the currency of the first country based on the price in the currency of the second country of the article and the selected exchange rate.

5. The settlement method according to claim 4, wherein the server reports to the merchant device the first exchange rate applicable to the user for the predetermined period of time, the method further comprising:
changing the first exchange rate if the user who owns the mobile terminal apparatus meets a condition, and
calculating a discounted amount of payment for purchase of the article.

6. The settlement method according to claim 4, wherein the mobile terminal apparatus displays the article, the amount of payment for purchase of the article in the currency of the first country, and the amount of payment for purchase of the article in the currency of the second country, and the merchant device further performs control to acquire positional information from the mobile terminal apparatus, identify the merchant shop at which the mobile terminal apparatus is located based on the positional information, calculate the amount of payment for purchase of the article in the currency of the first country from the price in the currency of the second country of the article and fees corresponding to the identified merchant, and display the calculated amount of payment on the image, the predetermined period is determined by a period of time for which the user stays in a second country, and the sales information is reported by the merchant device.

* * * * *